(12) United States Patent
Masaki

(10) Patent No.: US 8,274,011 B2
(45) Date of Patent: Sep. 25, 2012

(54) SOLDERING DEVICE AND METHOD OF MAKING SAME

(75) Inventor: Hiroyuki Masaki, Shijonawate (JP)

(73) Assignee: Hakko Corporation, Osaka (JP)

( * ) Notice: Subject to any disclaimer, the term of this patent is extended or adjusted under 35 U.S.C. 154(b) by 472 days.

(21) Appl. No.: 12/631,725

(22) Filed: Dec. 4, 2009

(65) Prior Publication Data
US 2010/0187205 A1    Jul. 29, 2010

Related U.S. Application Data

(60) Provisional application No. 61/147,092, filed on Jan. 24, 2009.

(51) Int. Cl.
*B23K 3/04* (2006.01)
*H05B 3/00* (2006.01)

(52) U.S. Cl. ........ 219/85.16; 29/592; 29/611; 219/85.1; 219/229; 219/237; 219/238; 219/241; 228/8; 228/33; 228/41; 228/51; 228/52; 228/54; 228/55

(58) Field of Classification Search ............ 29/592, 29/611; 219/85.1, 85.16, 229, 237, 238, 219/241; 228/8, 33, 41, 51, 52, 54, 55
See application file for complete search history.

(56) References Cited

U.S. PATENT DOCUMENTS
2008/0010808 A1 * 1/2008 Shigekawa ............... 29/592

FOREIGN PATENT DOCUMENTS
| EP | 0386948 | 9/1990 |
| JP | S51-153733 (U) | 12/1976 |
| JP | S61-27559 (U) | 2/1986 |
| JP | A-H03-8566 | 1/1991 |
| JP | Y-2528124 | 12/1996 |
| JP | B-41481581 | 9/2008 |

OTHER PUBLICATIONS

International Preliminary Report on Patentability for International Application No. PCT/JP02010/050779, dated Aug. 9, 2011, 6 pages.

* cited by examiner

*Primary Examiner* — Asok Sarkar
(74) *Attorney, Agent, or Firm* — Squire Sanders (US) LLP

(57) ABSTRACT

A soldering device includes a tip member and a temperature sensor embedded within the tip member by a buckled copper pipe that is thermally conductive. A soldering device includes a tip member and a temperature sensor embedded within the tip portion by application of a crimping force that deforms the tip portion onto the temperature sensor. A soldering device includes a tip member, a heater member, and a thermally conductive wedge that is pushed into a gap between the tip member and the heater member. A soldering device includes a tip cartridge carried by a handle assembly that includes an o-ring and an o-ring cover that keeps the o-ring from falling off of the handle assembly. The o-ring cover includes a hook portion that engages a catch feature of the handle housing.

18 Claims, 11 Drawing Sheets

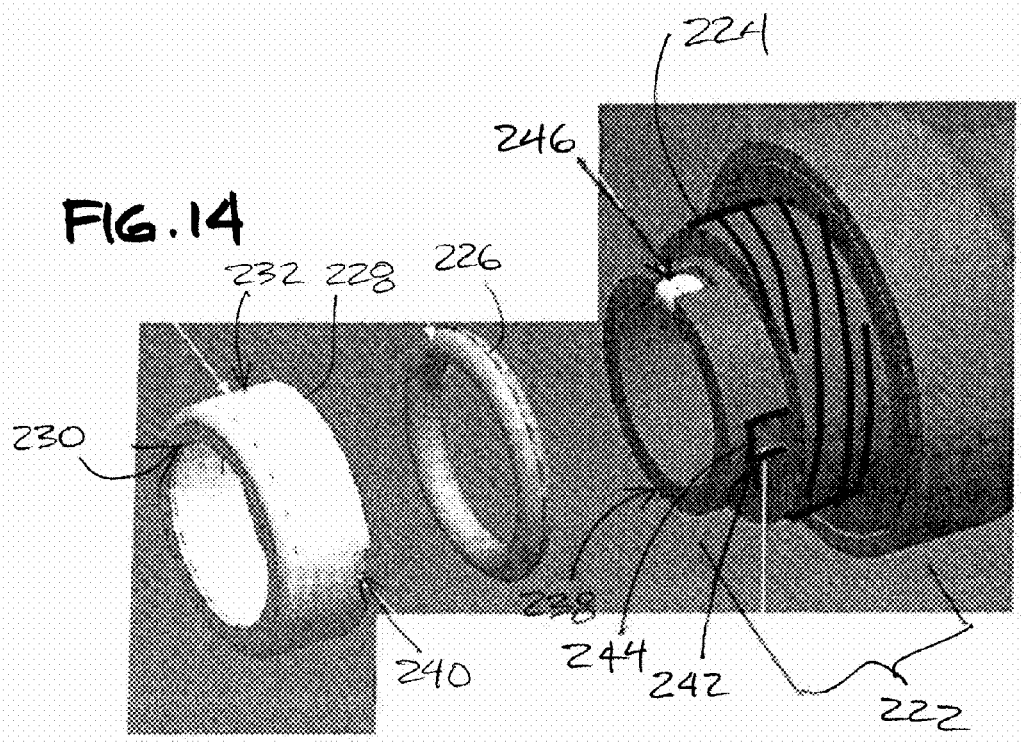
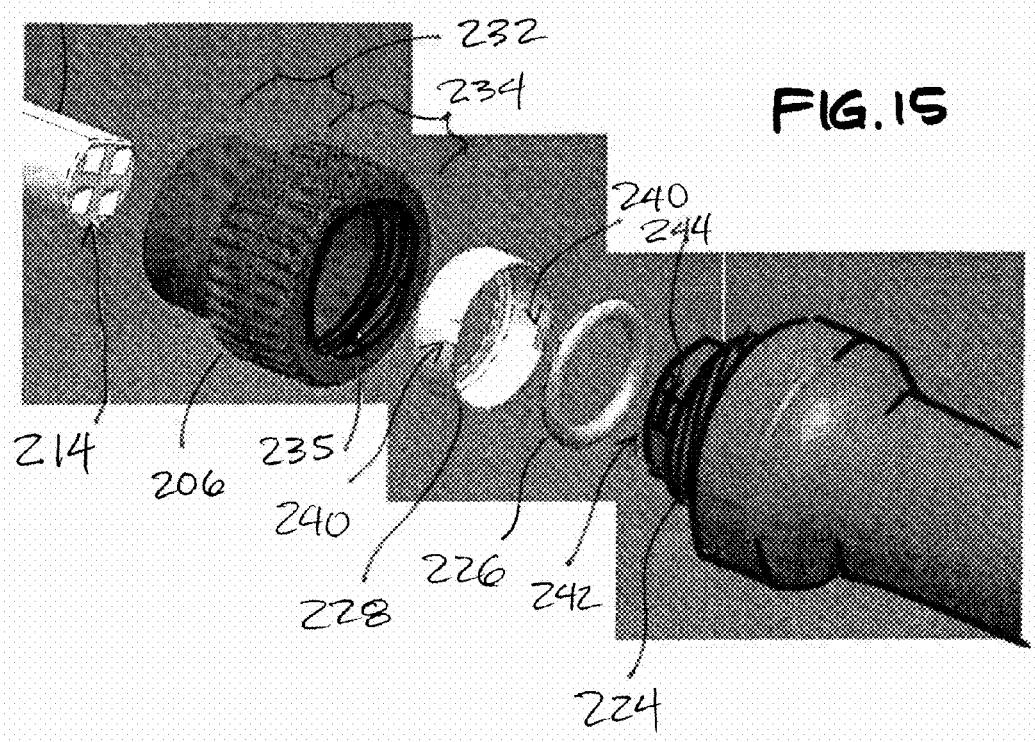

SOLDERING DEVICE AND METHOD OF MAKING SAME

CROSS-REFERENCE TO RELATED APPLICATION

This application claims the benefit of U.S. Provisional Application No. 61/147,092, filed Jan. 24, 2009, which is incorporated herein by reference in its entirety.

BACKGROUND OF THE INVENTION

1. Field of the Invention

This invention relates generally to a soldering device and a method of making a soldering device.

2. Description of the State of the Art

Conventional soldering devices include heating and sensor circuits imprinted onto a heating member. A drawback with such devices is that coverage of the heating circuit around the heating member is limited and/or non-uniform due to traces of the sensor circuit which pass through the heating circuit. Another drawback with such devices is that the sensor circuit, which is intended to detect the working temperature at the front end of the soldering iron tip, is located on the heating member. This often means that the sensor circuit is not positioned as close as possible to the front end of the soldering iron tip, which can adversely affect accuracy of temperature measurements.

Conventional soldering devices include a tip cartridge and a handle having various engagement elements that keep the tip cartridge attached to the handle. Disassembly of the of the tip cartridge from the handle, such as during maintenance, often results in inadvertent loss of the engagement elements.

Accordingly, there is a need for a soldering device with a temperature sensor that can be attached in a reliable manner and that can accurately measure the temperature of the soldering iron tip. There is also a need for a soldering device which can be disassembled and has engagement elements that include loss prevention features.

SUMMARY OF THE INVENTION

Briefly and in general terms, the present invention is directed to a soldering device and a method of making a soldering device.

In some aspects of the present invention, a soldering device comprises a tip member, a heater member, a temperature sensor and a pipe. The tip member includes a front tip, a rear end, and a hole formed into the rear end. The hole has a bottom surface in which a recess is formed. The heater member is disposed inside the hole. The temperature sensor is disposed inside the recess and is located between the heater member and front tip. The pipe is disposed inside the recess.

In further aspects, the pipe is a copper pipe. In detailed aspects, copper pipe has a buckled or crumpled configuration.

In some aspects of the present invention, a method comprises passing a pair of electrical wires of a temperature sensor through a pipe, inserting a temperature sensor with the pipe into a blind hole formed into a rear end of a tip member, the blind hole having a bottom surface in which a recess is formed, the recess being smaller in diameter than the blind hole. The method further comprises moving the temperature sensor with the pipe into the recess, and placing a pipe into the recess after the inserting of the temperature sensor into the recess. The method further comprises deforming the pipe inside the recess, and placing a heater member in the hole and behind the temperature sensor.

The features and advantages of the invention will be more readily understood from the following detailed description which should be read in conjunction with the accompanying drawings.

BRIEF DESCRIPTION OF THE DRAWINGS

FIG. 14 is an exploded, perspective view of the soldering device of FIG. 12, showing a recess formed in the handle housing and a hook feature on the o-ring cover sized to fit within the recess.

FIG. 15 is an exploded perspective view of the soldering device of FIG. 12, showing internal threads on the nipple and external threads on the handle housing which are configured to rotatably engage each other.

DETAILED DESCRIPTION OF THE INVENTION

Figure 1:
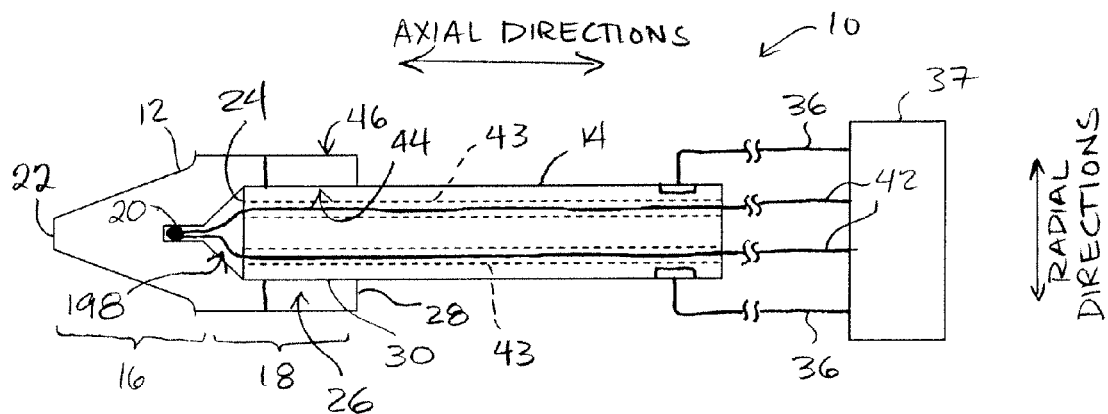
FIG. 1 is a cross-sectional view of a soldering device, showing a tip member carried by heater member.

Referring now in more detail to the exemplary drawings for purposes of illustrating embodiments of the invention, wherein like reference numerals designate corresponding or like elements among the several views, there is shown in FIG. 1 a soldering device 10 having a tip member 12 attached to a heater member 14. The tip member is configured to heat a workpiece during a soldering operation. The tip member includes a tip portion 16 and a hollow skirt or cylindrical sleeve portion 18. The heater member extends into and is in thermal contact with the sleeve portion. The heater member includes a heating element configured to generate heat and to transfer the heat to the tip member. A temperature sensor 20 is embedded in the tip member 12 at a location between a front tip 22 of the tip member and a forward surface 24 of the heater member. The forward surface is at the front of the heater member and no portion of the heater member extends axially in front of the forward surface. The temperature sensor 20 can optionally be a thermocouple or a thermistor. Other types of temperature sensors can be implemented instead of a thermocouple and thermistor.

In some embodiments, the tip member 12 has a blind hole 26 formed into a rear surface 28 of the tip member. The heater member 14 has a forward portion 30 having a shape that corresponds to and mates with the blind hole. The blind hole and the forward portion of the heater member can have cylindrical shapes, or other types of shapes, that maintain good thermal contact between respective surfaces of the blind hold and the forward portion. The tip member 12 can be made of metal, which may optionally be formed by machining, metal injection molding, sintering together of metal particles, or any combination of these processes.

Figure 2:
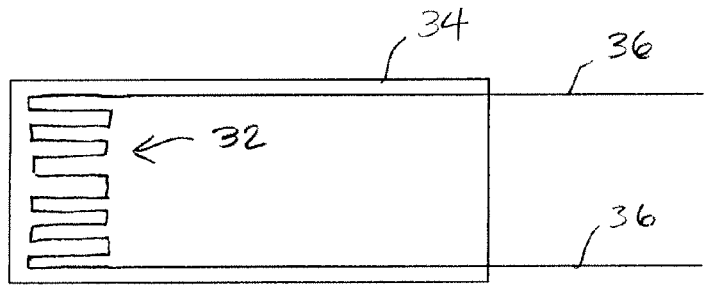
FIG. 2 is a plan view of a ceramic sheet, showing a printed heating pattern at a forward segment of the sheet.

In some embodiments, the heater member 14 is a ceramic heater member which includes a ceramic rod with an electrical resistance heating element. As shown in FIG. 2, the heating element can be an electrical resistance circuit 32 that is printed onto a ceramic sheet 34. Metal powder can be printed on a surface of a green ceramic sheet to form the heating pattern, then the green ceramic sheet is wrapped onto the ceramic rod with the printed surface facing inward and toward the outer surface of the ceramic rod so that the green ceramic sheet serves as an outer layer of insulative ceramic material on the ceramic rod. Next, the wrapped ceramic rod is allowed to dry and is sintered.

It should be understood that in some embodiments of the present invention there is no sensor pattern on the ceramic sheet 34 and the heater member 14.

The printed heating pattern 32 is located at the forward portion 30 of the heater member 14 so that the printed heating pattern is partially or completely inside the sleeve portion 18 of the tip member 12. When wrapped on the ceramic rod, the printed heating pattern 32 extends around the entire circumference of the ceramic rod. A pair of electrical wires 36 extend from the printed heating pattern and are connected to a power source or to an electronic controller device 37 (FIG. 1) configured to maintain the temperature of the tip member 12 at a desired level based at least in part on the temperature determined from the temperature sensor 20. The desired temperature level allows the tip member to melt solder.

Figure 16:
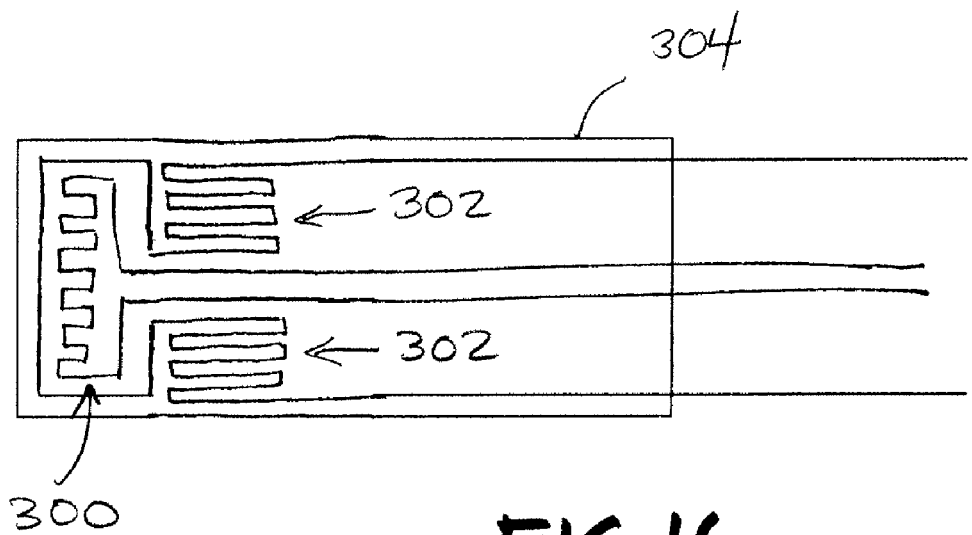
FIGS. 16 and 17 are plan views showing prior art circuit patterns.
Figure 17:
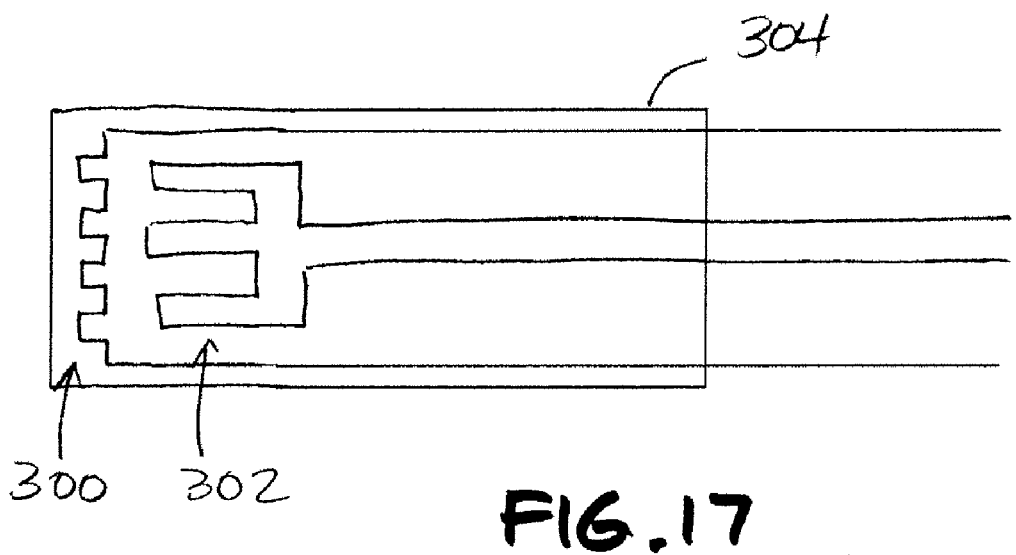

The temperature sensor 20 of the present invention is spaced apart from the heater member 14, which distinguishes the present invention from prior art devices shown in FIGS. 16 and 17. The prior art devices have both a sensor circuit pattern 300 and a heating circuit pattern 302 printed on a ceramic sheet 304 that is later wrapped around a ceramic rod. The absence of a sensor circuit pattern on a ceramic rod of some embodiments of the present invention allows the printed heating circuit pattern 32 (FIG. 2) to be arranged as close as possible to the forward end of the ceramic rod, which brings the heat source closer to the tip portion than in the prior art devices. Also, in the prior art devices, the printed sensor circuit pattern 300 is located forward of the heating circuit pattern 302 in order to allow for a more accurate temperature reading of the tip portion. Thus, in the prior art devices, electrical traces from the sensor circuit pattern pass through the heating circuit pattern, which causes the heating circuit pattern to be disrupted and have a limited coverage (FIG. 17) or non-uniform coverage (FIG. 16) of the circumference of the ceramic rod (not shown). In some embodiments of the present invention, the lack of a printed sensor circuit pattern on the heater member 14 means that there are no electrical traces from the sensor circuit pattern that would have to pass through the heating circuit pattern 32, thereby allowing the heating circuit pattern 32 to provide complete and uniform coverage around a forward circumference of the ceramic rod.

Figure 3:
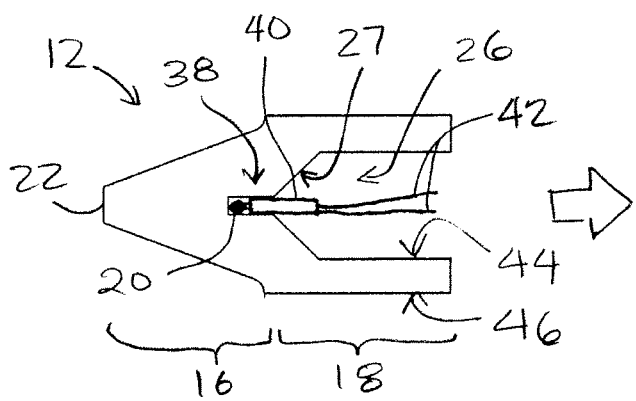
FIG. 3 is a partial cross-sectional view of a tip member, showing a temperature sensor and a pipe disposed in a recess formed in the tip member.

The temperature sensor 20 can be imbedded in the tip member 12 in various ways. In some embodiments, the temperature sensor is in a cylindrical recess formed into the tip portion 16 of the tip member 12. As shown in FIG. 3, the recess 38 is in communication with the blind hole 26 of the sleeve portion 18 of the tip member. In this way, the temperature sensor can be inserted through the blind hole and into the recess. The recess and the temperature sensor are located behind the front tip 22 of the tip portion and in front of the blind hole. The recess is smaller in diameter than the blind hole and is formed into a bottom surface 27 of the blind hole. The bottom surface 27 is tapered toward the center of the tip portion 16 and leads to a step feature that defines a circular edge of an opening of the recess 38.

The temperature sensor 20 is retained inside the recess 38 by a pipe 40 made of copper or other material with high thermal conductivity. The temperature sensor is connected to a pair of electrical wires 42 that are connected to the electronic controller device 37. The electrical wires 42 extend inside the central passageway of the pipe, exit out of the rear end of the pipe, extend into axial passageways 43 (FIG. 1) inside the heater member, and exit out of the rear end of the heater member. In this way, the electrical wires 42 do not disrupt heating coverage of any printed heating circuit on the forward portion 30 of the heater member 14.

Figure 4:
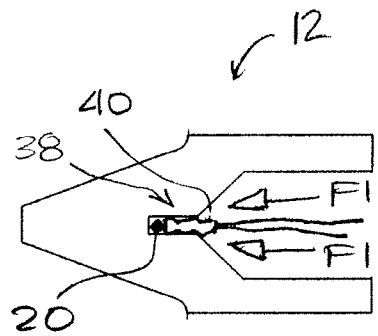
FIG. 4 is a partial cross-sectional view of the tip member of FIG. 3 after the pipe has been deformed inside the tip member.

Referring again to FIG. 3, the pipe 40 is placed inside the recess 38 formed in the tip member 12. The temperature sensor 20 is adjacent to the forward end of the pipe and can optionally extend outside and in front of the pipe. To keep the temperature sensor 20 embedded, an axial force F1 in a forward direction can be applied to a rear end of the pipe, as shown in FIG. 4. The force F1 pushes the pipe forward and is sufficient to cause the pipe to buckle, crumple, or otherwise deform inside the recess 38. The buckling and deformation fixes the temperature sensor in place with good thermal contact with the tip member 20.

Figure 5:
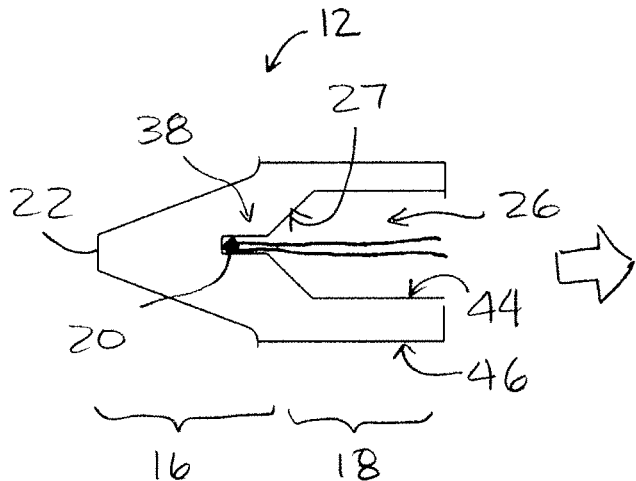
FIG. 5 is a partial cross-sectional view of a tip member, showing a temperature sensor in a recess formed in the tip member.
Figure 6:
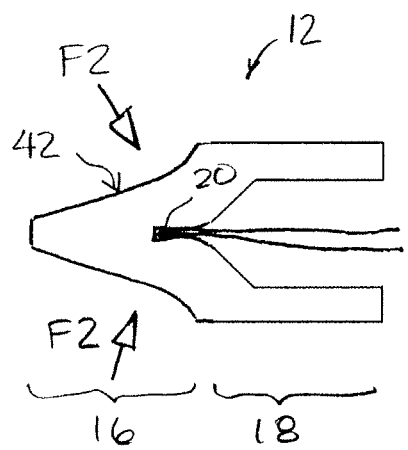
FIG. 6 is a partial cross-sectional view of the tip member of FIG. 5 after the tip member has been deformed by a force so that the temperature sensor is firmly retained in the recess.

In some embodiments, the temperature sensor 20 is embedded in the recess 38 of the tip member 12 by causing surfaces within recess to pinch or press down on the temperature sensor 20. This can be accomplished by inserting the temperature sensor 20 through the blind hole 26 and into the recess 38, as shown in FIG. 5, followed by applying a radially compressive force F2 to outside surfaces 42 of the tip portion 16 of the tip member, as shown in FIG. 6.

In some embodiments, the radially compressive force F2 is applied before or after the pipe 40 is buckled or crumpled as discussed in connection with FIG. 4. In other embodiments, the radially compressive force F2 is applied without use of the pipe 40, as discussed in connection with FIG. 6.

In some embodiments, an inner diameter of the sleeve portion 18 is the same as an outer diameter of the forward portion 30 of the heater member 14. In some embodiments, the sleeve portion 18 of the tip member 12 presses or pinches the forward portion 30 of the heater member 14. In some embodiments, at least a portion of the blind hole 26 within the sleeve portion can be sized slightly smaller in diameter than the forward portion to allow the tip member and the heater member to be frictionally engaged.

In some embodiments, the sleeve portion 18 may include slits or slots that extend axially to allow the sleeve portion to thermally expand and/or to flex slightly to receive the forward portion 30 of the heater member 14. In this way, when the forward portion 30 is placed inside the blind hole 26, radially inward facing surfaces 44 within the blind hole press down on, squeeze or pinch the forward portion. Alternatively or in addition to the foregoing, radially compressive forces can be applied to the radially outward facing surfaces 46 of the sleeve portion 18 so that the radially inward facing surfaces 44 within the blind hole 26 press down on, squeeze, or pinch the forward portion 30 of the heater member 14.

As used herein, the term "radially inward" refers to a direction or orientation toward a central region or central axis. The term "radially outward" refers to a direction or orientation away from a central region or central axis.

In some embodiments, such as shown in FIGS. 4 and 6, the tip member 12 is configured to be fixedly attached to the heater member 14. The tip member 12 is configured to remain in place on the heater member 14 without any provision for replacement or detachment. That is, the tip member 12 is non-replaceable in some embodiments.

Figure 7:
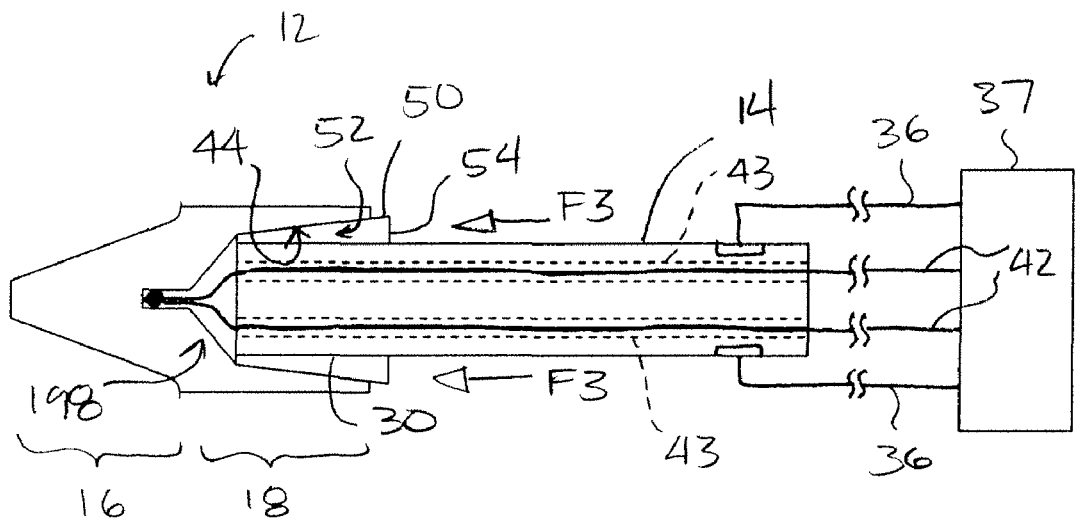
FIG. 7 is a partial cross-sectional view of a soldering device, showing a wedge disposed tightly between tip member and a heater member.

In some embodiments, as shown in FIG. 7, a wedge 50 fixedly attaches the tip member 12 and the heater member 14 together and increases thermal conduction from the heater member to the tip member. The wedge is configured to efficiently conduct heat from the heater member to the tip member. The wedge can be made of copper or other material with high thermal conductivity.

In some embodiments, the wedge 50 is placed inside a gap 52 between the forward portion 30 of the heater member 14 and the radially inward facing surfaces 44 of the blind hole 26. An axial force F3 in a forward direction can be applied to a rear end 54 of the wedge after the forward portion 30 of the heater member 14 is placed inside the sleeve portion 18 of the tip member 12. As a result, the wedge presses radially inward against the forward portion of the heater member and presses radially outward against the sleeve portion of the tip member.

Figure 8:
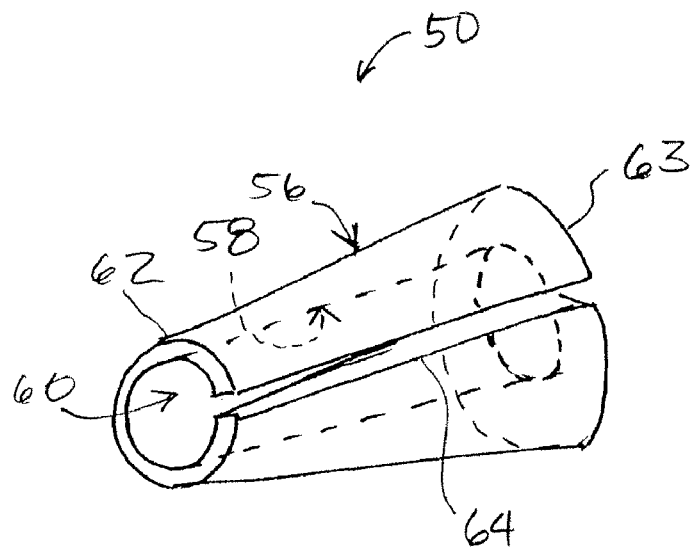
FIG. 8 is a perspective view of a wedge for increasing thermal conduction from a heater member to a tip member.

In some embodiments, the wedge 50 is configured as shown in FIG. 8. The wedge has an outer thermal contact surface 56 and an inner thermal contact surface 58. The outer thermal contact surface is tapered or has a cone-like shape. The inner thermal contact surface is cylindrical and defines an axial passageway 60 that runs the entire length of the wedge. The outer and inner thermal contact surfaces define a curved and tapered wall having a thickness that is narrower or thinner at the front end 62 of the wedge than at the rear end 63 of the wedge.

A slit or narrow slot 64 is formed entirely through the curved wall of the wedge so that the slot is in communication with the axial passageway 60. The slot 64 runs axially along the entire length of the wedge.

In some embodiments, an inner diameter of the axial passageway 60 is the same as an outer diameter of the forward portion 30 (FIG. 7) of the heater member 14. In some embodiments, the axial passageway is slightly smaller in diameter than the forward portion of the heater member to allow the wedge and the heater member to be frictionally engaged with each other and to help ensure that the inner thermal contact surface 58 provides greater pressure to and better thermal contact with the forward portion. The slot may allow the wedge to flex slightly to allow a limited expansion of the inner diameter of the axial passageway, thereby allowing for temperature induced expansion, that is, thermal expansion and/or thereby accommodating the forward portion of a slightly larger heater member.

It should be understood that the wedge 50 can optionally be used with any of the embodiments described above in connection with FIGS. 1-6.

It will be appreciated that the wedge 50 can be used with soldering irons that have a relatively high heat capacity. High heat capacity soldering irons have a relatively thicker and more massive tip member. In general, thicker tip members used in high heat capacity soldering irons are difficult to compress with a radial force F2 (FIG. 6) applied to an outer surface of the tip member. Therefore, the wedge 50 can optionally be used with high heat capacity soldering irons in order to increase thermal conduction from the heater member to the tip member.

In some embodiments, the tip and sleeve portions 16, 18 are inseparable and are integral parts of the tip member 12. In other embodiments, the tip and sleeve portions 16, 18 have a separation interface that allows the two parts to detach from each other.

In some embodiments, a tip portion of a soldering device is configured to be removed from the soldering device when desired by the user.

Figure 9:
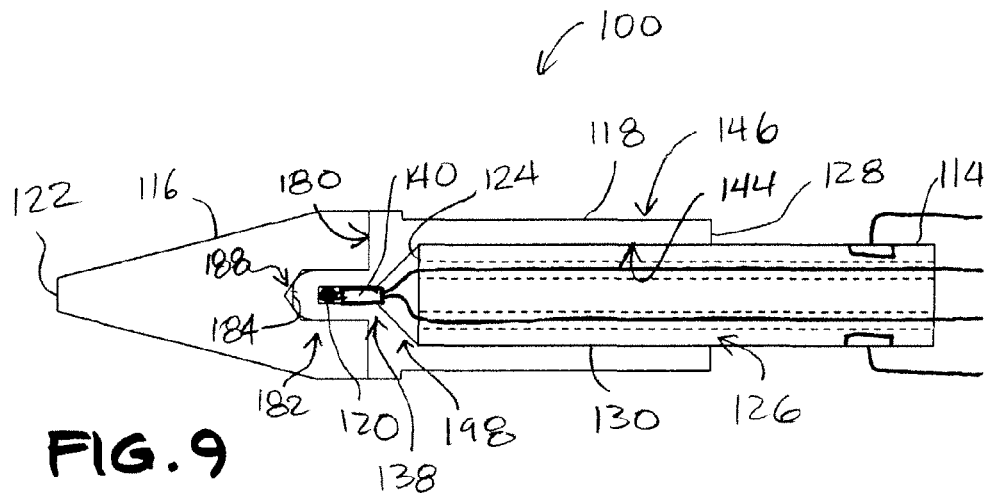
FIG. 9 is a partial cross-sectional view of a soldering device, showing a temperature sensor embedded in a protruding part of a thermal conductive sleeve, the protruding part disposed within a removable tip.

As shown in FIG. 9, a soldering device 100 includes a heater member 114, a tip portion 116, and a cylindrical sleeve portion 118. The heater member extends into and is in thermal contact with the sleeve portion. The heater member is configured to generate heat and to transfer the heat to the sleeve portion, and the sleeve portion is configured to transfer the heat to the tip portion. The heater member can be a ceramic heater that is identical to the ceramic heater described above in connection with FIGS. 1 and 2.

Figure 10:
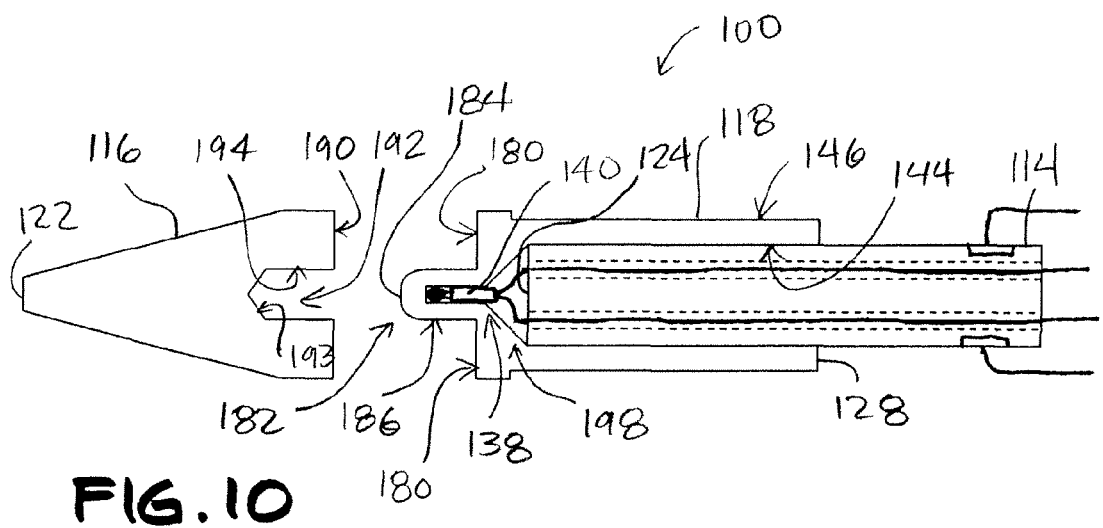
FIG. 10 is a partial cross-sectional view of the soldering device of FIG. 9, showing the removable tip detached from the thermal conductive sleeve.

In some embodiments, as shown in FIG. 10, the tip portion 116 (also referred to as a replaceable tip) and the sleeve portion 118 (also referred to as a thermal conductive sleeve) are detachable from each other. The thermal conductive sleeve can be considered as the tip member which is a separate and distinct from the replaceable tip.

Figure 11:
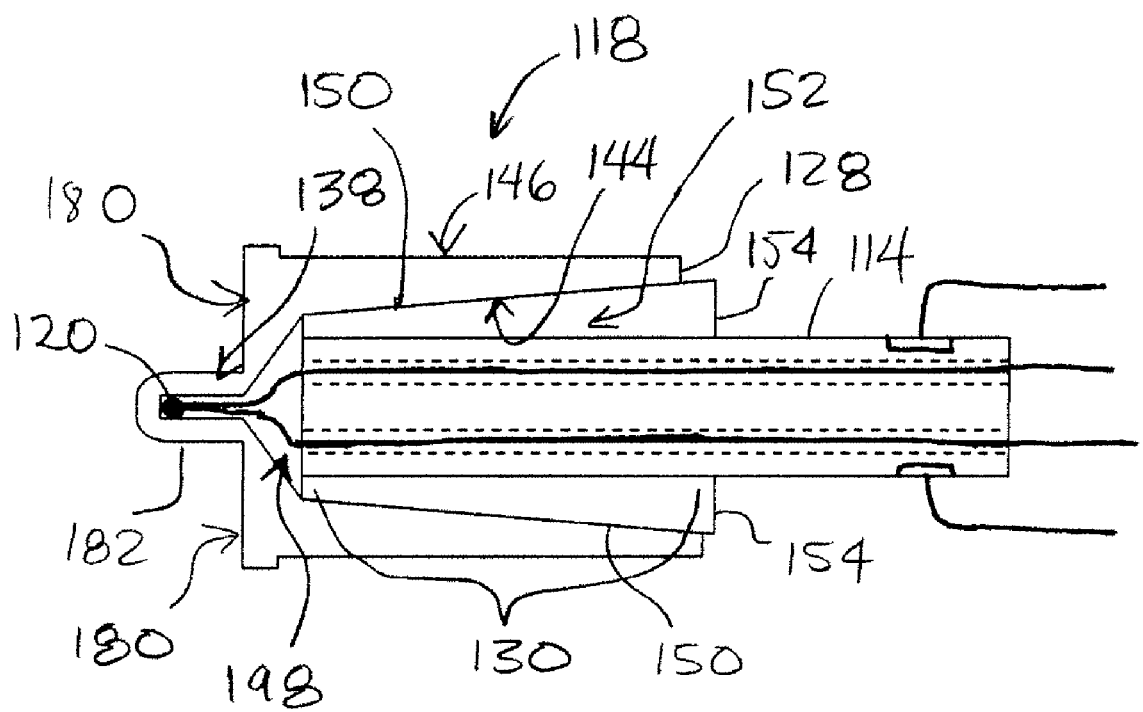
FIG. 11 is partial cross-sectional view of a soldering device, showing a wedge pushed tightly between a thermal conductive sleeve and a heater member.
Figure 12:
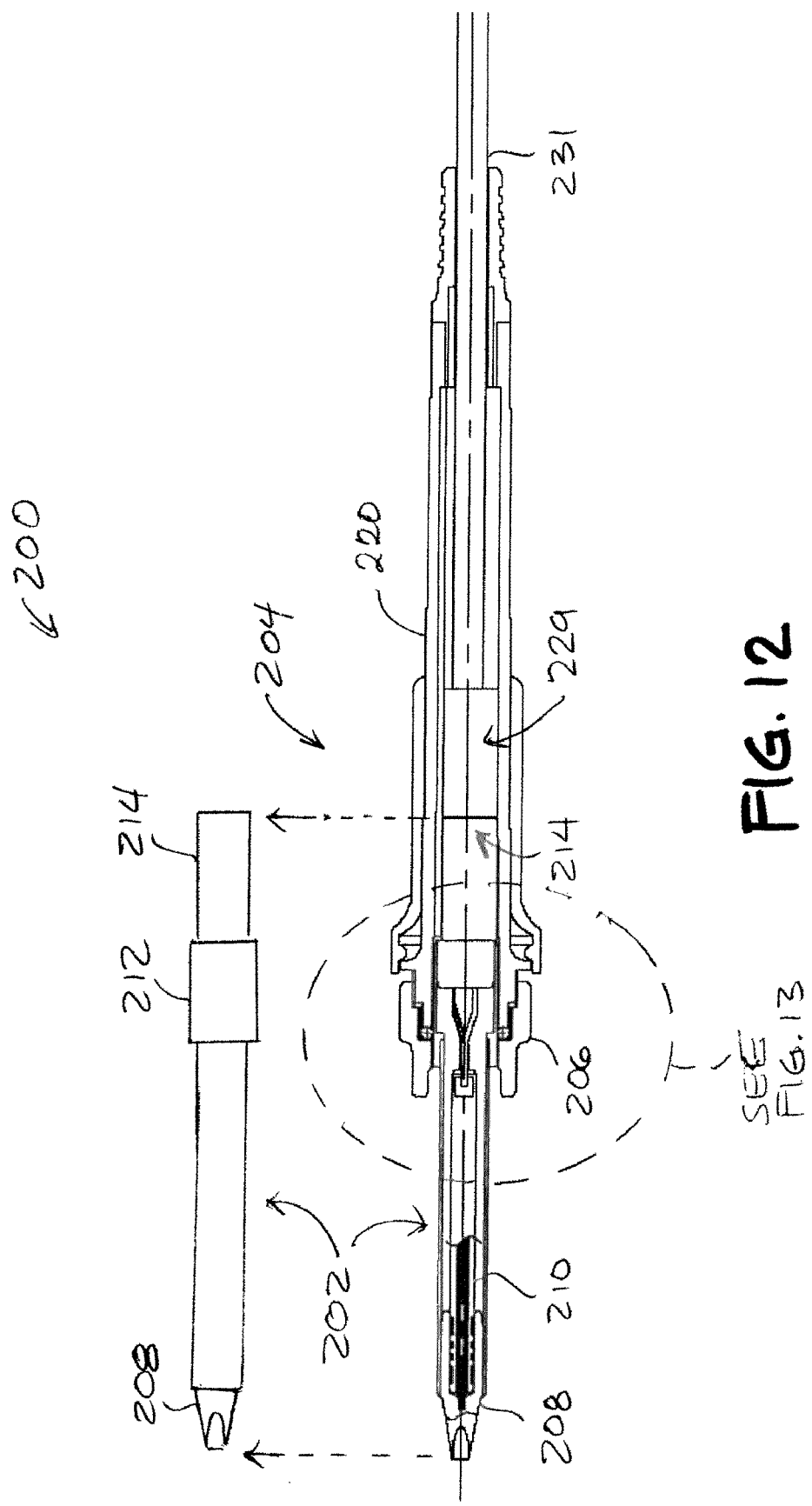
FIG. 12 is a cross-sectional view of a soldering device, showing a tip cartridge partially disposed within a handle assembly.

In some embodiments, the tip portion 116 and the sleeve portion 118 are made of metal and may optionally be formed by machining, metal injection molding, sintering together of metal particles, or combinations thereof. The sleeve portion 118 has a blind hole 126 formed into a rear end 128 of the sleeve portion. The heater member 114 has a forward portion 130 having a shape that corresponds to and mates with the blind hole. As shown in FIG. 11, the blind hole and the forward portion of the heater member can have cylindrical shapes, or other types of shapes, that maintain good thermal contact between respective surfaces of the blind hold and the forward portion.

A temperature sensor 120 is embedded in the sleeve portion 118 at a location between a front tip 122 of the tip member and the forward surface 124 of the heater member. The temperature sensor 120 can optionally be a thermocouple or a thermistor. Other types of temperature sensors or transducers can be implemented instead of a thermocouple and thermistor. In some embodiments, the temperature sensor 120 and a heating element of the heater member are optionally connected to an electronic controller device configured to maintain the temperature of the tip portion 116 at a desired level based at least in part on the temperature determined from the temperature sensor 120.

The sleeve portion 118 includes a flat, annular-shaped surface 180 that transfers heat to the tip portion 116 and faces in an axially forward direction toward the tip portion. The heat transferring surface 180 encircles or surrounds a protruding part 182 that is cylindrical in shape and extends axially in front of the heat transferring surface and the remainder of the sleeve portion. The temperature sensor 120 is embedded in the protruding part at an axial location between the heat transferring surface 180 and a forward tip 184 of the protruding part. In other words, the temperature sensor 120 is in front of the heat transferring surface 180 and behind the forward tip 184 of the protruding part.

The tip portion 116 includes a flat, annular-shaped surface 190 that receives heat from the heat transferring surface 180 of the sleeve portion 118. The heat receiving surface 190 encircles or surrounds an opening of a bore 192 formed into the rear end of the tip portion. The bore is shaped and sized to receive the protruding part 182 of the sleeve portion 118. Radially inward facing surfaces 194 in the bore contact radially outward facing surfaces 186 of the protruding part. An interface, which allows for separation of the tip and sleeve portions, is formed by the heat transferring surface 180 which faces axially forward, the heat receiving surface 190 which faces axially backward, the radially outward facing surface 186 of the protruding part 182, and the radially inward facing surface 194 within the bore 192. In some embodiments, the heat transferring surface 180 and the heat receiving surface 190 are identical in size, area, and shape.

In some embodiments, the bore 192 and the protruding part are sized so that there is an air gap 188 (FIG. 9) between the bottom surface 193 (FIG. 10) of the bore and the forward tip 184 of the protruding part 182. In some embodiments, the bore and protruding part have the same diameter. In some embodiments, the bore is sized slightly smaller in diameter than the protruding part so that there is a friction fit between the radially inward facing surfaces 194 of the bore and the radially outward facing surfaces 186 of the protruding part.

In some embodiments, the temperature sensor 120 is in a cylindrical recess 138 formed into the protruding part 182. The recess is located in front of and is in communication with the blind hole 126 of the sleeve portion 118. In this way, the temperature sensor can be inserted through the blind hole and into the recess. A bottom surface of the blind hole is tapered toward the center of the protruding part and leads to a circular step feature that defines a circular edge of a round opening of the recess 138.

In some embodiments, as shown in FIGS. 9 and 10, the temperature sensor 120 is retained inside the recess 138 by a pipe 140 made of copper or other material with high thermal conductivity. The pipe 140 is placed inside the recess 138. The temperature sensor 120 is adjacent to the forward end of the pipe and can optionally extend outside and in front of the pipe. The pipe 140 retains and provides good thermal conductivity in the same manner as described above in connection with FIGS. 3 and 4. Optionally, the pipe 140 is deformed to have a buckled or crumpled configuration inside the recess in the manner described above in connection with FIGS. 3 and 4.

In some embodiments, an inner diameter of the sleeve portion 118 is the same as an outer diameter of the forward portion 130 of the heater member 114. In some embodiments, the sleeve portion presses or pinches the forward portion of the heater member. In some embodiments, at least a portion of the blind hole within the sleeve portion can be sized slightly smaller in diameter than the forward portion of the heater member.

In some embodiments, the sleeve portion 118 may include slits or slots that extend axially to allow the sleeve portion to flex slightly to receive the forward portion 130 and/or allow for thermal expansion. In this way, radially inward facing surfaces 144 (FIGS. 10 and 11) within the blind hole press down on, squeeze or pinch the forward portion when the forward portion is placed inside the blind hole. Alternatively or in addition to the foregoing, radially compressive forces can be applied to the radially outward facing surfaces 146 of the sleeve portion 118 so that the radially inward facing surfaces 144 within the blind hole press down on, squeeze, or pinch the forward portion of the heater member.

In some embodiments, as shown in FIG. 11, a wedge 150 can be used to fixedly connect the thermal conductive sleeve 118 and the heater member 114 together and increase thermal conduction from the heater member to the thermal conductive sleeve. The wedge is configured to allow efficient transfer of thermal energy to a replaceable tip that is pressed on the thermal conductive sleeve. The wedge can be made of copper or other material with high thermal conductivity.

In some embodiments, the wedge 150 is placed inside a gap 152 between the forward portion 130 of the heater member and the radially inward facing surfaces 144 of the blind hole. An axial force can be applied in a forward direction to a rear end 154 of the wedge after the forward portion is placed inside the thermal conductive sleeve 118. As a result, the wedge presses radially inward against the forward portion of the heater member and presses radially outward against the thermal conductive sleeve. In some embodiments, the wedge 150 is configured identically to the wedge 50 of FIG. 8.

It should be understood that the wedge 150 can optionally be used with any of the embodiments described above in connection with FIGS. 9 and 10.

In some embodiments, there is an air gap 198 between the front end of the heater member 14, 114 and the bottom surface of the blind hole 26, 126, as shown in FIGS. 1, 7, and 9-11. In other embodiments, there is no such air gap. In some embodiments, the front end of the heater member 14, 114 contacts and abuts the bottom surface of the blind hole 26, 126. In other embodiments, a material is filled into a space between the front end of the heater member and the bottom surface of the blind hole.

Referring next to FIGS. 12-15, a soldering device 200 includes a cylindrical tip cartridge 202, a cylindrical and hollow handle assembly 204, and a cylindrical and ring-shaped nipple 206 that is rotatable. The tip cartridge is slideably engaged with the handle assembly. The nipple 206 functions as a knob which may be manipulated by a user of the soldering device. The nipple is configured to lock the tip cartridge and the handle assembly together and to allow them to be separated when desired by the user of the soldering device. The tip cartridge 202 includes a tip member 208 and a heater member 210. The tip member 208 can be made of a metal.

The tip cartridge 202 includes a rear segment 212 and a tip cartridge electrical connector 214 (FIG. 15) at the end segment. The rear segment can be made of a metal, and the tip cartridge connector can be made of plastic. The handle assembly 204 includes a hollow handle housing 220 having a forward end segment 222, male or external threads 224 at the forward end segment, an o-ring 226 located in front of the external threads, a circular o-ring cover 228 configured to cover and hold the o-ring on the forward end segment, a power cord connector 229 that is engaged to a power cord 231 connectable to an electrical power source. The o-ring is completely enclosed by the o-ring cover, the forward end segment of the handle housing, and the rear segment of the tip cartridge. Electronic components to control the temperature of the tip cartridge 202 is equipped within a control box (not shown in FIG. 12-15) which can be provided with the handle assembly.

Figure 13:
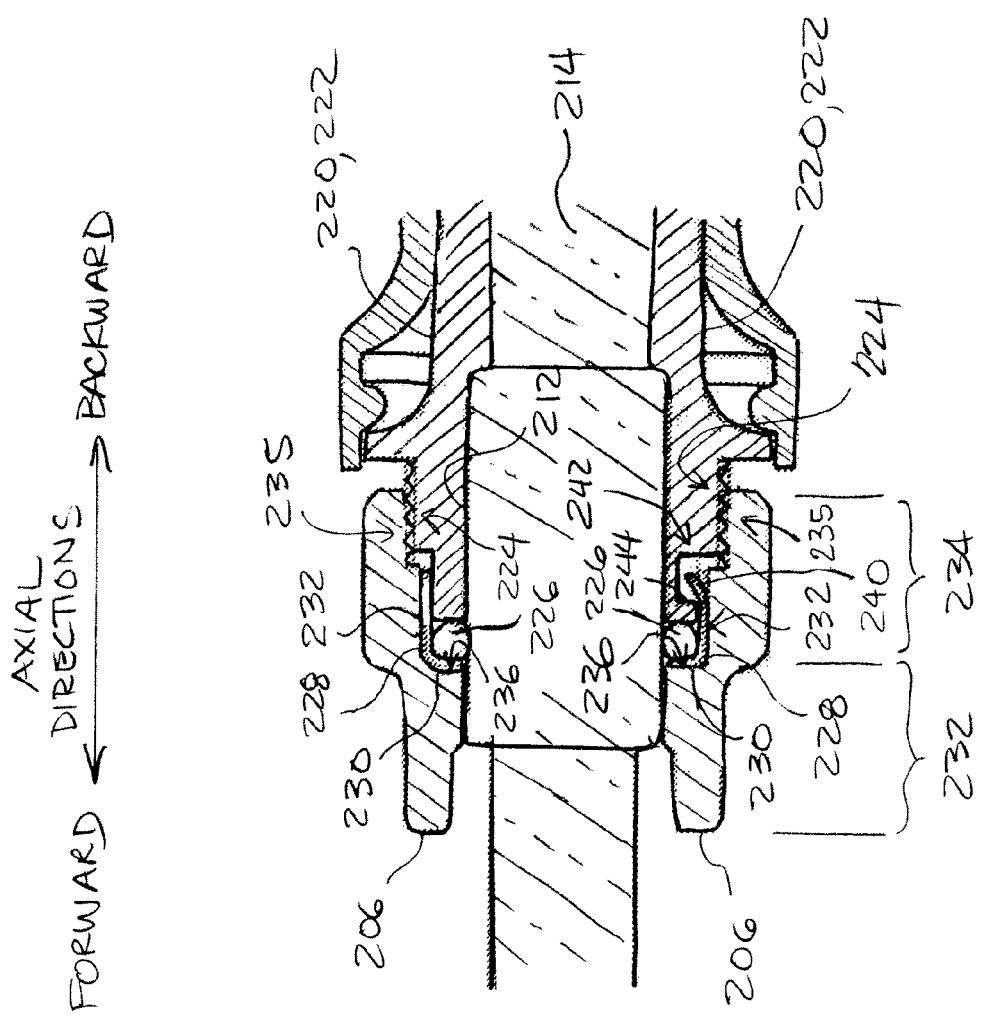
FIG. 13 is a detailed cross-sectional view of the soldering device of FIG. 12, showing an o-ring and an o-ring cover which are disposed between a rotatable nipple and a handle housing of the handle assembly.

With continued reference to FIGS. 13-15, the o-ring cover 228 includes a ring-shaped wall that includes a front wall portion 230 that is in front of the o-ring and an outer wall portion 232 that runs circumferentially around the outer perimeter of the o-ring. When the tip cartridge and the handle assembly are attached to each other, the rear segment 212 of the tip cartridge 202 passes through the center of the o-ring and the o-ring cover, so that the rear segment is at least partially contained within the handle housing 220.

The nipple 206 includes an inner surface that generally faces radially inward. There are female or internal threads 235 on the inner surface. The internal threads mate with and rotatably engage the external threads 224 of the handle housing 220. The inner surface defines narrow and wide portions of the nipple. The narrow portion 232 is located in front of the wide portion 234. The internal threads 235 are located at a rear end of the wide portion. The narrow portion has an internal diameter that is smaller than that of the wide portion. The difference in internal diameters results in an annular step feature at the junction between the narrow and wide portions. The step feature includes an annular compression surface 236 that faces in an axially backward direction toward the o-ring cover 228 and the o-ring 226. The o-ring and the o-ring cover are adjacent to the compression surface 236 and are disposed within the wide portion 234 and behind the narrow portion 232 of the nipple 206. The outer diameter of the o-ring and the outer diameter of the o-ring cover are both greater than an internal diameter of the narrow portion 232 and less than an internal diameter of the wide portion 234.

In operation, rotation of the nipple 60 in a tightening direction relative to the handle housing 220 causes the compression surface 236 of the nipple to move axially toward the o-ring cover 228 and the o-ring 226. The o-ring cover 228 is configured to have a limited amount of axial movement. Nipple rotation causes the compression surface 236 to push the o-ring cover 228 axially backward against the o-ring, thereby squeezing the o-ring against the forward end 238 (FIG. 14) of the handle housing. In response, the o-ring deforms to a compressed state. When in the compressed state, the o-ring is spread radially inward, allowing it to press against and frictionally engage the rear segment 212 of the tip cartridge 202. The frictional engagement prevents the tip cartridge from sliding out of the handle housing.

Rotation of the nipple 206 in the opposite direction (loosening direction) allows the o-ring 226 to deform toward its natural or uncompressed state, thereby decreasing frictional engagement between the o-ring and the rear segment 212 and allowing the tip cartridge 202 to be completely pulled out of the handle housing 220.

In some embodiments, continued rotation of the nipple 206 in the loosening direction allows the nipple to completely detach from the handle housing 220. The o-ring cover 228 includes a tab or hook portion 240 that extends into a recess 242 formed radially inward on an outer surface of the forward end segment 222 of the handle housing. The hook portion 240 is sized to allow it to move axially forward and backward within the recess, thereby allowing the limited axial movement of the o-ring cover 228. The hook portion engages an edge or catch feature 244 of the recess which prevents the o-ring cover from detaching off the handle housing. Therefore, even when the nipple is completely detached from the handle housing 220, the o-ring 226 remains trapped between the forward end 238 of the handle housing and the front wall portion 230 of the o-ring cover. This prevents inadvertent loss of the o-ring.

In some embodiments, the o-ring cover 228 is made of a metal sheet. During assembly of the soldering device 200, the o-ring cover is slideably placed over the o-ring and the forward end segment 222 of the handle housing 220, and then the hook portion 240 is pressed radially inward, which causes the hook portion to bend into the recess 242 of the handle housing. Thereafter, the o-ring cover and the o-ring cannot slide off from the handle housing.

In some embodiments, the o-ring cover 228 includes two or more hook portions 240 spaced apart around the circumference of the o-ring cover, and the handle housing 220 includes two or more recesses 242 which are similarly spaced apart around the circumference of the forward end segment 222 of the handle housing.

In some embodiments, an electrical grounding terminal 246 is located at the forward end segment 222 of the handle housing 220. The tip cartridge 202 makes electrical contact with the grounding terminal when the tip cartridge 202 is inserted within the handle housing.

The tip member 208 and a heater member 210 of the tip cartridge 202 are optionally identical to any of the tip members and the heater members described above in connection with FIGS. 1-11. The tip cartridge 202 optionally includes a temperature sensor located within the tip member and which can be identical to any of the temperature sensors described above in connection with FIGS. 1-11. The tip cartridge 202 optionally includes a replaceable tip that may be identical to the replaceable tip described above in connection with FIG. 10. The tip cartridge 202 optionally includes a pipe for holding the temperature sensor in place, and the pipe is located within the tip member and can be identical to any of the pipes described above in connection with FIGS. 3, 4, 9 and 10. The tip cartridge 202 optionally includes a wedge that may be identical to the wedge described above in connection with FIGS. 7, 8, and 11.

In some embodiments, the soldering device 200 need not include one or more of a replaceable tip, a temperature sensor, a pipe for holding the temperature sensor, and a wedge. According to such embodiments, the soldering device 200 has the following non-exclusive elements: a handle housing including a forward end segment; a tip cartridge including a rear segment disposed within the forward end segment of the handle housing; an o-ring cover including a front wall portion and a hook portion that retains the o-ring cover onto the forward end segment of the handle housing; and an o-ring disposed between the front wall portion of the o-ring cover and the forward end segment of the handle housing. Optionally, the hook-portion is a sheet metal tab that engages a catch feature on the forward end segment of the handle housing.

In some embodiments, the soldering device 200 omits any number of features described above in connection with FIGS. 1-11, and is capable of operating without a replaceable tip, a temperature sensor, a pipe for holding the temperature sensor, a wedge, or combinations thereof. According to such embodiments, the soldering device 200 has the following non-exclusive elements: a handle housing; a tip cartridge including a rear segment disposed within the handle housing; a ring-shaped nipple including a compression surface, the tip cartridge extending through the nipple, the nipple removably attached to the handle housing; an o-ring cover including a front wall portion disposed between the handle housing and the compression surface of the nipple; and an o-ring disposed between the handle housing and the front wall portion of the o-ring cover. Optionally, the o-ring cover includes a hook portion that engages the handle housing to prevent the o-ring cover and the o-ring from detaching off of the handle housing. Optionally, the hook portion protrudes into a recess formed in the handle housing, and the recess is sized to allow axial movement of the o-ring cover relative to the handle housing.

A method in accordance with aspects of the invention is described below with reference to FIGS. 18A-18H. The method may optionally be implemented in making the above-described soldering devices 10, 100, 200. Although the method is described with terminology associated with elements of the above-described soldering devices, it will be appreciated that the following method is not limited to making the above-described soldering devices and may be implemented to make other types soldering devices.

Figure 18A:
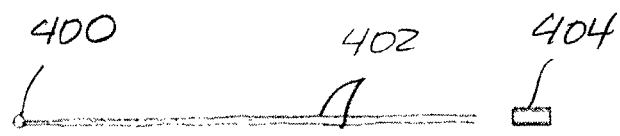
FIGS. 18A-18H are cross-sectional and partial cross-sectional views, illustrating a method of buckling or crumpling a pipe for attaching a temperature sensor to a tip member.
Figure 18B:
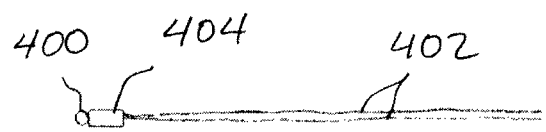

In FIGS. 18A and 18B, a temperature sensor 400 is connected to a pair of electrical wires 402 which are passed through a pipe 404. In FIG. 18A, the pipe is illustrated in cross section. The pipe can be a copper pipe and can be identical to any of the pipes described above in connection with FIGS. 3, 4, 9 and 10. The temperature sensor can be a thermocouple, a thermistor, or other type of device configured to measure temperature, and can be identical to any of the temperature sensors described above in connection with FIGS. 1-11.

Figure 18C:
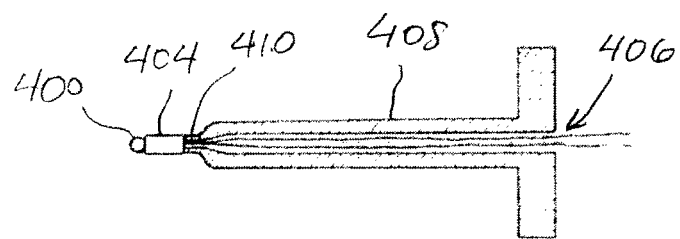
Figure 18D:
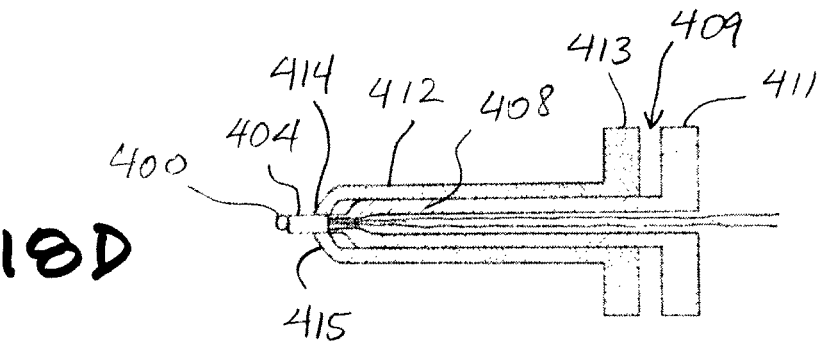

Next, as shown in FIG. 18C, the electrical wires 402 are passed through a central passageway 406 of a pressing jig 408. The pressing jig is illustrated in cross section and has a generally elongate cylindrical shape. The pipe 404 abuts a front end 410 of the pressing jig 408. Next, as shown in FIG. 18D, a guiding jig 412 is placed over the pressing jig 408, which is illustrated in cross section and has a hollow, cylindrical shape. The pipe 404 extends through and is disposed within a front orifice 414 of the guiding jig 412. A gap 409 exists between the respective rear ends 411, 413 of the pressing and guiding jigs.

Figure 18E:
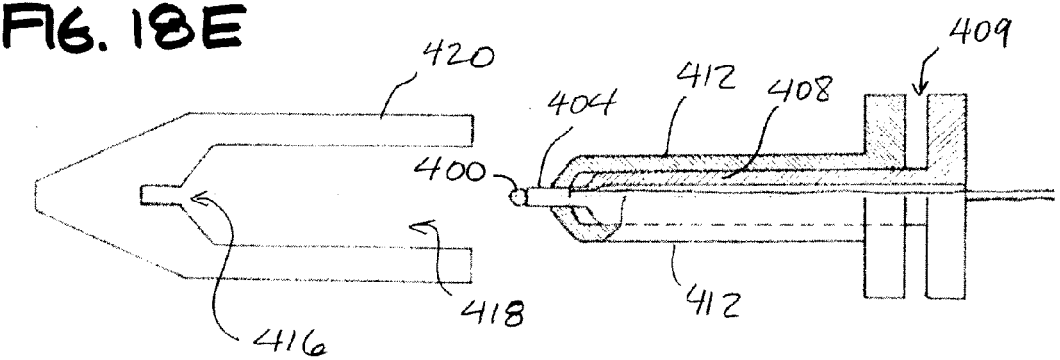
Figure 18F:
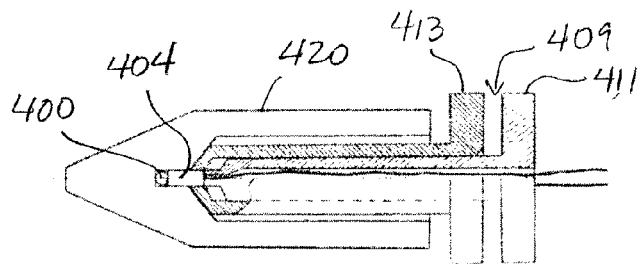

As shown in FIGS. 18E and 18F, the temperature sensor 400 and the pipe 404 are simultaneously inserted into a recess 416 at the bottom of a blind hole 418 of a tip member 420. The tip member can be identical to any of the tip members described above in connection with FIGS. 1-11. The guiding jig 412 carries the temperature sensor and pipe and is used to insert the temperature sensor and pipe into the blind hole and the recess. The front end 415 of the guiding jig abuts the bottom of the blind hole.

Figure 18G:
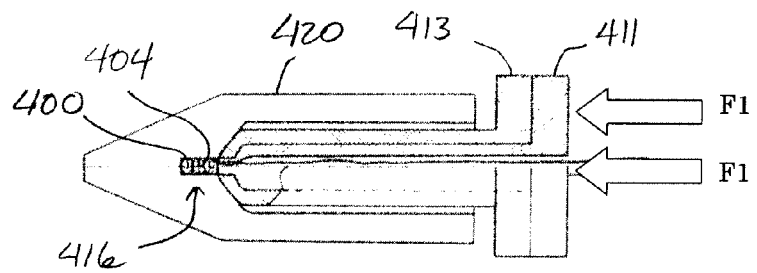

Next, as shown in FIG. 18G, the rear end 411 of the pressing jig 408 is pushed axially in a forward direction with a force F1 toward the rear 413 of the guiding jig 412. The rear end 411 of the pressing jig 408 is pushed until the gap 409 (FIG. 18F) is completely closed (FIG. 18G). The force F1 is transmitted to a rear end of the pipe 404. As a result, the pipe 404 buckles or crumples (FIG. 18G) within the recess 416 and is, thereby, tightly packed within the recess. In some embodiments, the size of the open gap 409 is limited so that only a desired amount of buckling or crumpling of the pipe occurs when the rear ends 411, 413 of the pressing and guiding jigs are brought together.

Figure 18H:
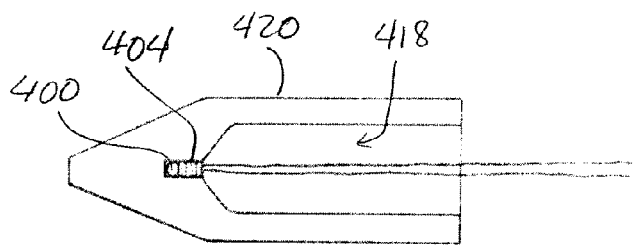

As shown in FIG. 18H, the pressing jig 408 and guiding jig 412 are pulled out of the blind hole 418 of the tip member 420, leaving the temperature sensor 400 and pipe 404 fixedly attached to the tip member. Thereafter, a heating member may be placed in the blind hole.

A temperature sensor can optionally be fixedly attached to a tip member by brazing. When the recess is at the bottom of a narrow and deep blind hole, brazing can be performed by placing the tip member and the temperature sensor in a high temperature furnace.

The method of FIGS. 18A-18H may be implemented to fixedly attach the temperature sensor without brazing of the temperature sensor to the tip member. Without brazing, heat-induced damage to the temperature sensor, discoloration of the tip member, and damage to a protective coating on the tip member are avoided. Thermistors are prone to damage from brazing, so the method of FIGS. 18A-18H without brazing is also useful for embodiments having a thermistor as the temperature sensor.

The method of FIGS. 18A-18H may be implemented with a soldering device which does not have a ceramic heater but has a cylindrical heater made of electric heating wire and electric insulators.

While several particular forms of the invention have been illustrated and described, it will also be apparent that various modifications can be made without departing from the scope of the invention. It is also contemplated that various combinations or subcombinations of the specific features and aspects of the disclosed embodiments can be omitted, combined with or substituted for one another in order to form varying modes of the invention. Accordingly, it is not intended that the invention be limited, except as by the appended claims.

What is claimed is:

1. A soldering device comprising:
    a tip member including a front tip, a rear end, and a hole formed into the rear end, the hole having a bottom surface in which a recess is formed;
    a heater member disposed inside the hole;
    a temperature sensor disposed inside the recess and located between the heater member and front tip; and
    a pipe disposed inside the recess, wherein the pipe has a buckled configuration.

2. The soldering device of claim 1, wherein the pipe is a copper pipe.

3. The soldering device of claim 1, wherein electrical wires are connected to the temperature sensor, and the electrical wires extend inside and through the pipe.

4. The soldering device of claim 1, wherein the tip member includes a tip portion and a sleeve portion, the temperature sensor is disposed within the tip portion, and the heater member is disposed within the sleeve portion.

5. The soldering device of claim 4, wherein the recess containing the temperature sensor is part of the tip portion, and there is no separation interface between the tip portion and the sleeve portion.

6. The soldering device of claim 4, wherein the recess containing the temperature sensor is part of the sleeve portion, and there is a separation interface between the tip portion and the sleeve portion.

7. The soldering device of claim 1, wherein the tip member is a thermal conductive sleeve that includes a heat transferring surface and a protruding part extending out from the heat transferring surface, the recess is formed into the protruding part, and the temperature sensor and the pipe are disposed within the protruding part.

8. The soldering device of claim 7, wherein the pipe is a copper pipe having a deformed configuration.

9. The soldering device of claim 1, further comprising:
    a handle housing including a forward end segment;
    a tip cartridge including the tip member, the heater member, and a rear segment disposed within the forward end segment of the handle housing;
    an o-ring cover including a front wall portion and a hook portion that retains the o-ring cover onto the forward end segment of the handle housing; and
    an o-ring disposed between the front wall portion of the o-ring cover and the forward end segment of the handle housing.

10. The soldering device of claim 9, wherein the hook-portion is a sheet metal tab that engages a catch feature on the forward end segment of the handle housing.

11. The soldering device of claim 1, further comprising:
a handle housing;
a tip cartridge including the tip member, the heater member, and a rear segment disposed within the handle housing;
a ring-shaped nipple including a compression surface, the tip cartridge extending through the nipple, the nipple removably attached to the handle housing;
an o-ring cover including a front wall portion disposed between the handle housing and the compression surface of the nipple; and
an o-ring disposed between the handle housing and the front wall portion of the o-ring cover.

12. The soldering device of claim 11, wherein the o-ring cover includes a hook portion that engages the handle housing to prevent the o-ring cover and the o-ring from detaching off of the handle housing.

13. The soldering device of claim 12, wherein the hook portion protrudes into a recess formed in the handle housing, and the recess is sized to allow axial movement of the o-ring cover relative to the handle housing.

14. The soldering device of claim 11, wherein the nipple is configured to rotate and screw onto the handle housing, wherein when the nipple is rotated in a tightening direction, the compression surface of the nipple moves the front wall portion of the o ring cover so that the o-ring deforms to a compressed state in which the o-ring engages the rear segment of the tip cartridge.

15. A soldering device comprising:
a thermal conductive sleeve that includes a rear end, a hole formed into the rear end, a heat transferring surface, and a protruding part extending out of the heat transferring surface, there being a recess formed into the protruding part;
a heater disposed inside the hole;
a temperature sensor disposed within the protruding part;
a pipe disposed within the protruding part; and
a removable tip that includes a heat receiving surface detachably engaged to the heat transferring surface, wherein the protruding part and the temperature sensor are disposed within the removable tip.

16. A method of making a soldering device, the method comprising:
passing a pair of electrical wires through a pipe and placing a temperature sensor with the pipe into a blind hole formed into a rear end of a tip member, the blind hole having a bottom surface in which a recess is formed, the recess being smaller in diameter than the blind hole;
moving the temperature sensor with the pipe into the recess;
placing a pipe into the recess after the inserting of the temperature sensor into the recess;
deforming the pipe inside the recess; and
placing a heater member in the hole and behind the temperature sensor.

17. The method of claim 16, further comprising:
placing an o-ring and an o-ring cover on a forward end segment of a handle housing;
placing a hook portion of the o-ring cover into a recess in the forward end segment so that the o-ring is retained between the o-ring cover and forward end segment of the handle housing; and
inserting a rear segment of a tip cartridge through the o-ring and into the forward end segment of the handle housing, wherein the tip member and the heater member carried on the tip cartridge.

18. The method of claim 16, wherein the placing of the hook portion into the recess includes bending the hook portion to allow the hook portion to engage a catch feature of the recess.

* * * * *